United States Patent [19]

Licari

[11] Patent Number: 5,016,905

[45] Date of Patent: May 21, 1991

[54] TANDEM AXLE VEHICLE SUSPENSION SYSTEM

[76] Inventor: Vincent Licari, 5217 N. Baltimore, Gladstone, Mo. 64118

[21] Appl. No.: 339,992

[22] Filed: Apr. 17, 1989

[51] Int. Cl.$^5$ .............................................. B60G 5/02
[52] U.S. Cl. ..................................... 280/677; 280/678
[58] Field of Search .............. 280/677, 678, 681, 685, 280/679, 680

[56] References Cited

U.S. PATENT DOCUMENTS

| | | | |
|---|---|---|---|
| 2,493,026 | 1/1950 | Pointer | 280/677 |
| 2,579,556 | 12/1951 | Drong | 280/677 |
| 2,713,179 | 7/1955 | Clifton | 280/677 |
| 2,738,203 | 3/1956 | Misic | 280/677 |
| 3,014,735 | 12/1961 | Lich | 280/678 |
| 3,713,661 | 1/1973 | Luthman et al. | 280/677 |
| 4,360,220 | 11/1982 | Beers | 280/677 |

OTHER PUBLICATIONS

Technical Topics, Neway News, Spring 1973.

*Primary Examiner*—Richard A. Bertsch

[57] ABSTRACT

A suspension system for tandem axle vehicles includes: A pair of walking beams with opposite ends connected to tandem axles and with a transverse beam extending through said walking beams. A spring assembly located on each side of vehicle frame. Two vertical members, each one located between tandem tires with lower ends connecting opposite ends of said transverse beam and upper ends engaging said spring assemblies.

13 Claims, 5 Drawing Sheets

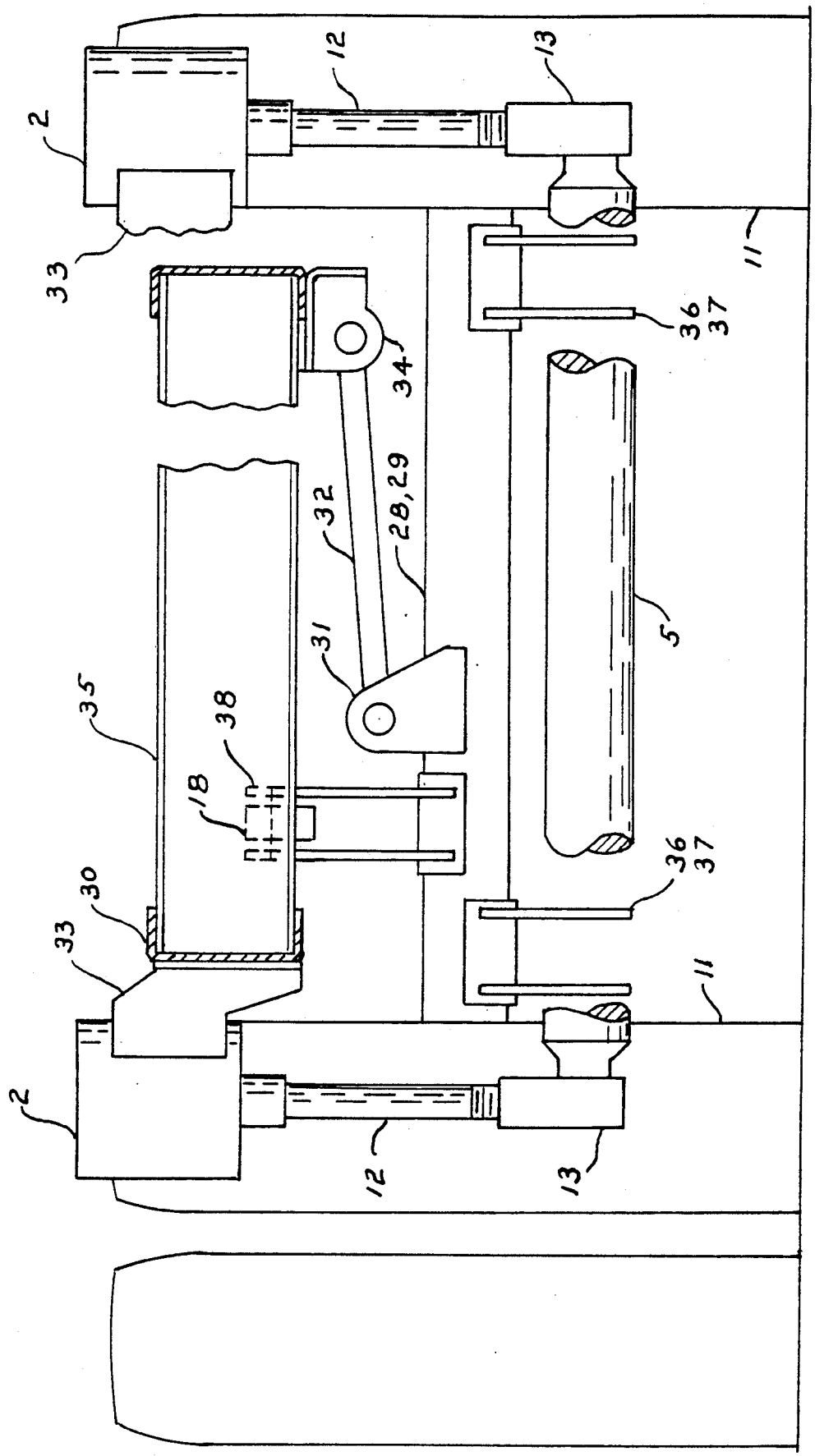

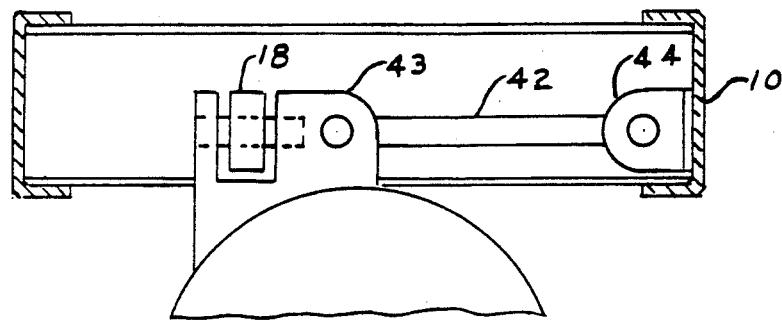
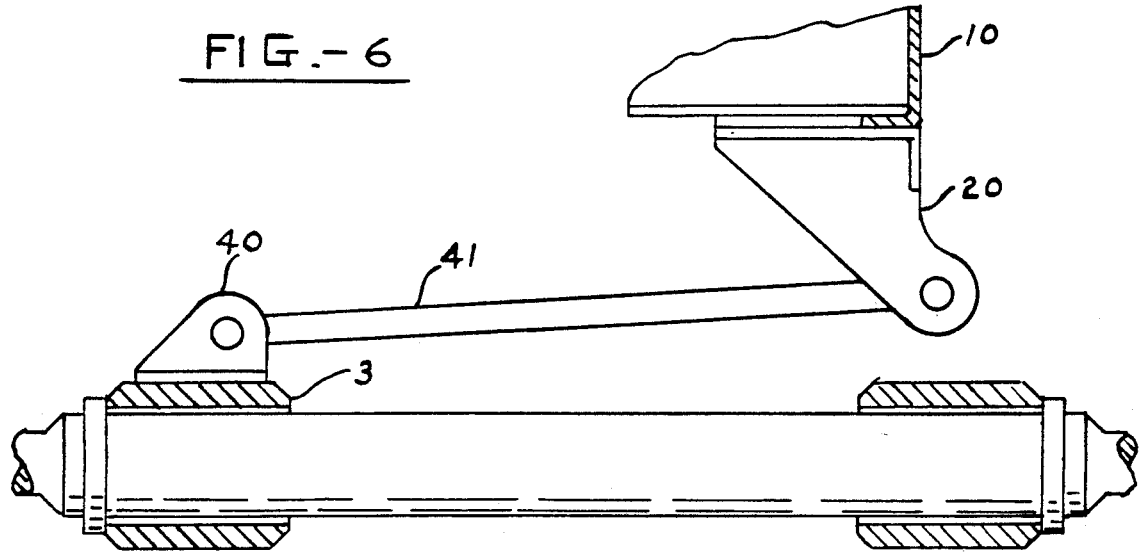

TANDEM AXLE VEHICLE SUSPENSION SYSTEM

BACKGROUND OF THE INVENTION

This invention relates to tandem axle suspensions typical in highway and off-highway vehicles.

Overall width of trucks and trailers is limited by regulations and suspension springs are generally located as close to the tires as possible for maximum vehicle stability. Spring deflection is usually compromised for vehicle stability resulting in a harsher ride than is desirable. In prior art, efforts to attain better vehicle stability within said vehicle width limits have been generally complicated, costly, or impractical, particularly so with drive axles.

Furthermore, tandem axle suspensions predominantly used in trucks and trailers have close axle spacing for best performance in traction and axle articulation. This close spacing has prohibited the practical use of rubber, air or coil springs in the narrow space between tandem tires.

This invention overcomes the problems herein described by providing for wider than normal spring spacing thereby improving vehicle stability and ride.

The main objective of this invention is to provide a simple low cost suspension system with improved stability and ride.

Another objective is to provide for wider than normal spring spacing.

Another objective is to provide for close axle spacing.

Another objective is to provide for a verticle member between tandem tires for transmitting ground forces to the suspension spring.

Another objective is to provide for vehicle height adjustment in the suspension.

Other objectives and advantages will be apparent in the following description, drawings and claims.

SUMMARY OF THE INVENTION

Improved stability and ride is accomplished by providing a suspension system for tandem axle vehicles including: A spring assembly located on each side of vehicle frame and in the "V" space between closely spaced tandem tires. Two walking beams adjacent to tires with opposite ends connected to tandem axles below axle centers and with a transverse beam extending through said walking beams. Two vertical members, each one located between closely spaced tandem tires with lower ends connected to opposite ends of said transverse beam and upper ends engaging spring assemblies. Two parallel radius arms for longitudinal restraint of tandem axles in relation to vehicle frame. Two torque arms for vehicle drive and braking torques, each one connecting an axle to vehicle frame. Radius means for lateral restraint of tandem axles in relation to vehicle frame

BRIEF DESCRIPTION OF DRAWINGS

FIG. 4 illustrates an end view of a trailer axle suspension system wherein transverse radius arms connect axles and vehicle frame.

FIG. 5 illustrates an end view of a drive axle suspension system wherein transverse radius arms connect axles and vehicle frame.

FIG. 6 illustrates an end view of the suspension system wherein a transverse radius arm connects a walking beam and vehicle frame.

DETAILED DESCRIPTION

Figure 1:
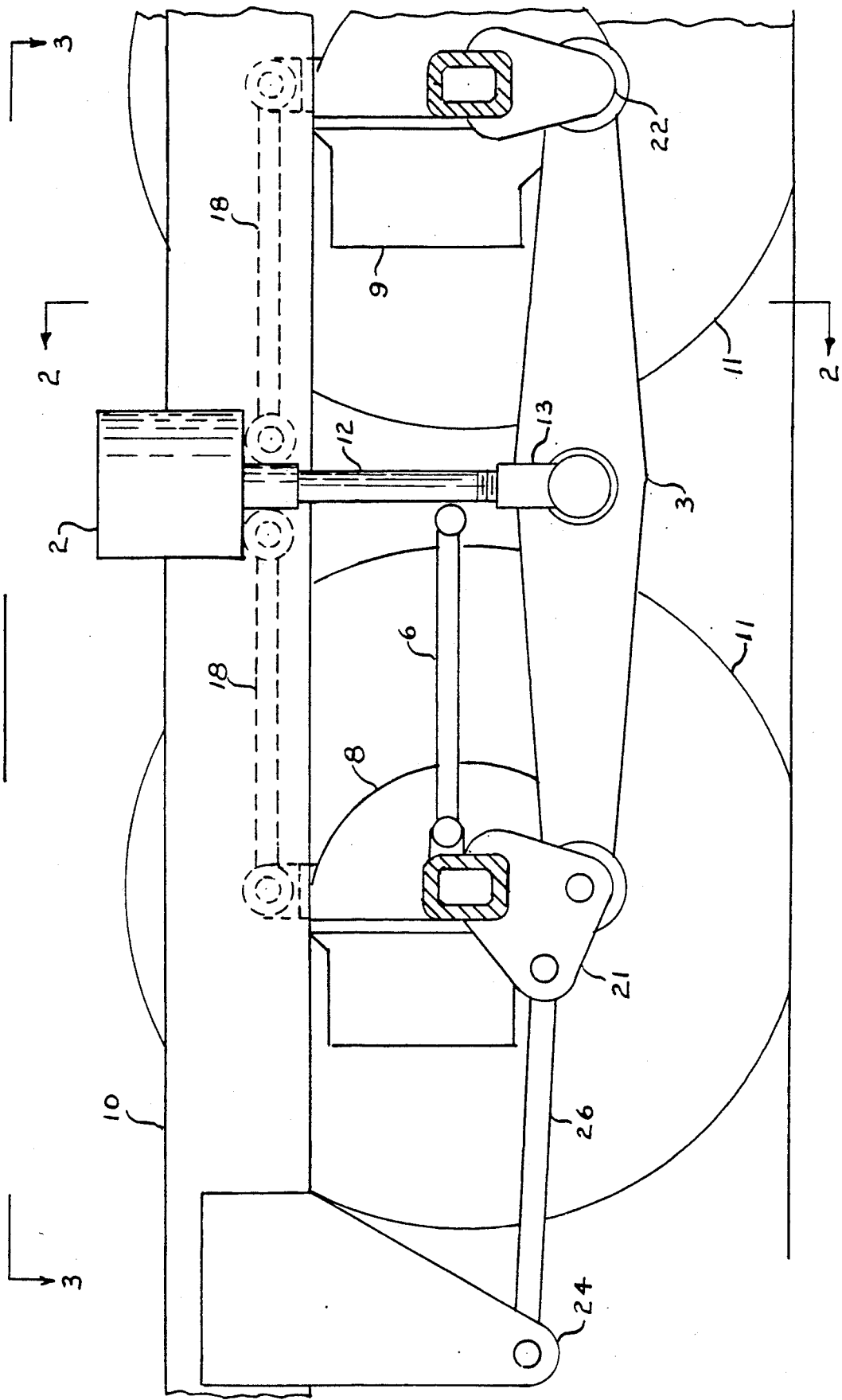
FIG. 1 is a side elevation view illustrating the preferred embodiment of this invention.
Figure 2:
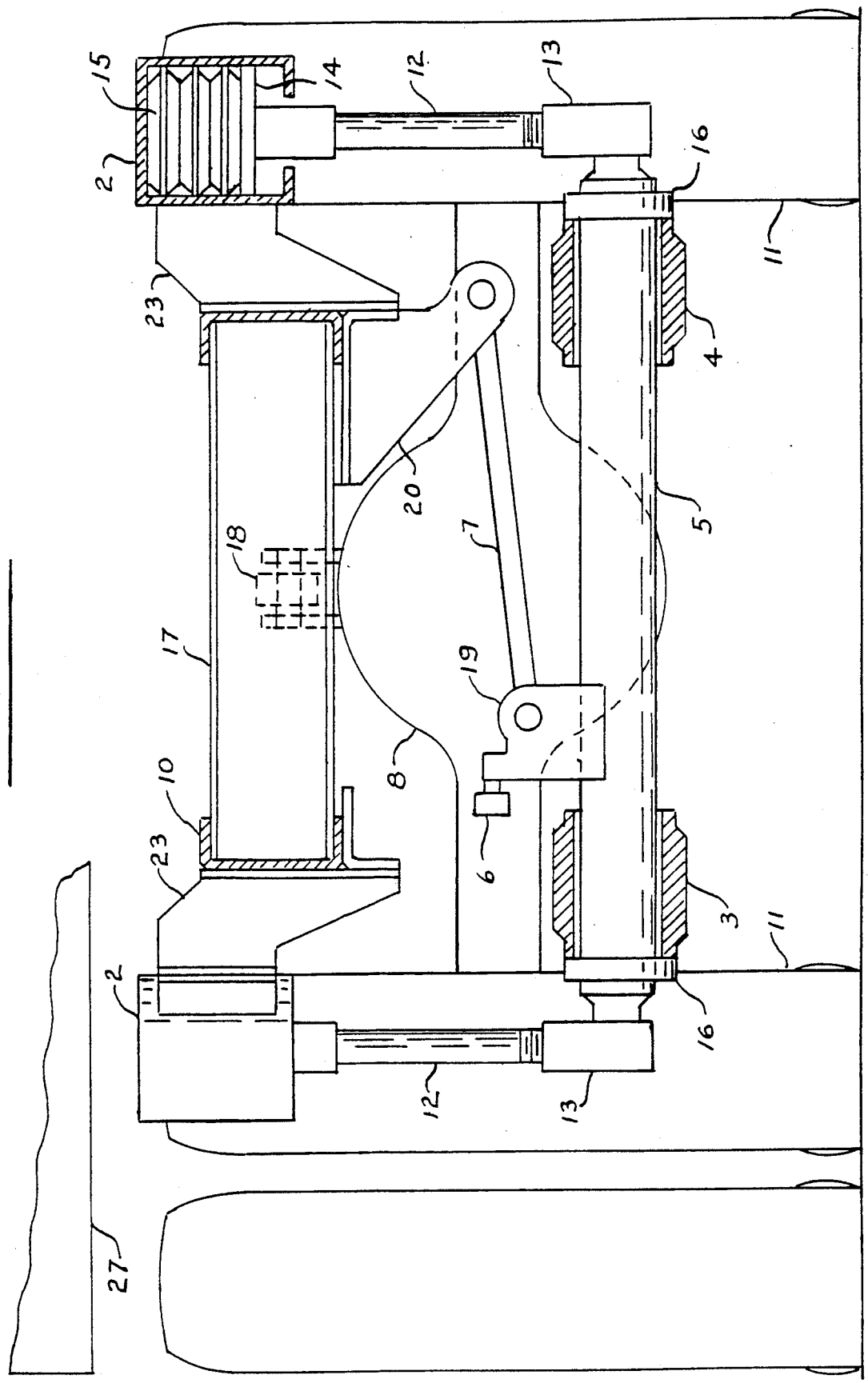
FIG. 2 is an end view illustrating the suspension system taken along section line 2—2 shown in FIG. 1.
Figure 3:
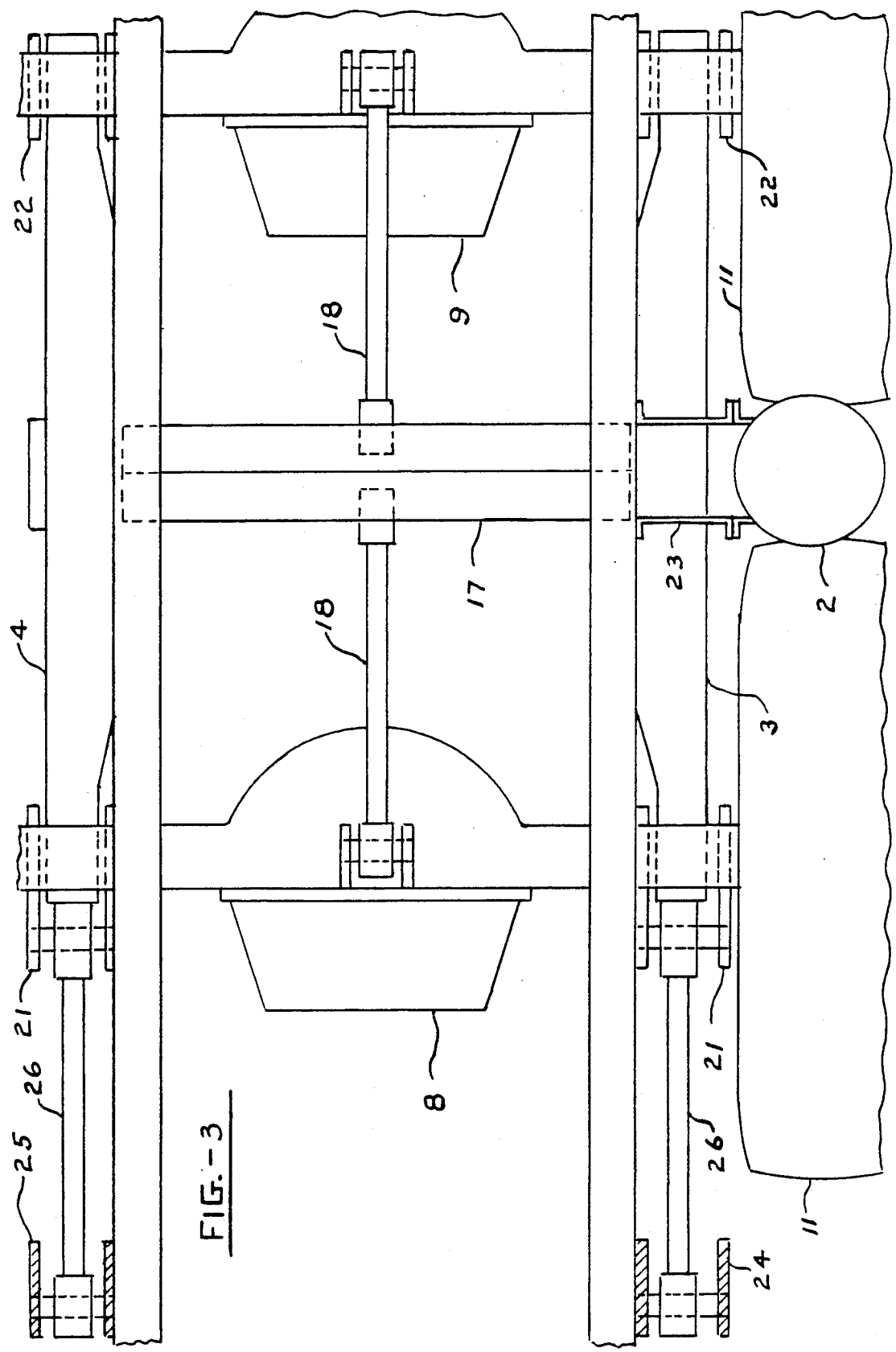
FIG. 3 is a plan view illustrating the suspension system taken along line 3—3 shown in FIG. 1.

The preferred embodiment of this invention is illustrated in FIGS. 1, 2 and 3.

Vehicle frame 10 includes frame brackets for suspension components.

Axles 8 and 9 are shown as drive axles but may be dead axles or axle 8 may be a drive axle and axle 9 may be a dead axle.

Tires 11 and wheels are mounted at the end of axles 8 and 9.

Two walking beams 3 and 4 are located adjacent to tires 11 with opposite ends pivotally connected to tandem axles 8 and 9 below axle centers by means of axle brackets 21 and 22.

A transverse beam 5 extends through said walking beams which are pivotal on said transverse beam. Thrust collars 16 restrain side movement of the walking beams.

A spring assembly 2, consisting of a housing and spring 15, is located on each side of vehicle frame 10 and in the "V" space between closely spaced tandem tires 11. Said spring assembly is mounted or attached to vehicle frame bracket 23 with the top of the spring assembly slightly above the tires permitting the low mounting of a truck or trailer body 27.

Two vertical members 12, and each one located in the space between closely spaced tandem tires 11, with lower ends connected to extended opposite ends of transverse beam 5 and upper ends engaging spring assemblies 2. Said members preferably being round rods threaded into rod eyes 13.

Threaded connection provides the means for vehicle height adjustment.

Upper ends of said vertical members 12 are provided with means 14 for suspension compressing spring 15 and means 14 for rebound stop, said means preferably consisting of a plate fastened to rod end.

Two radius arms 26 in parallel for longitudinal restraint of tandem axles 8 and 9 in relation to vehicle frame 10 are shown connecting vehicle frame and the interconnected tandem axles and walking beams, with ends pivotally pinned to frame brackets 24, 25 and axle brackets 21.

Two torque arms 18, for vehicle drive and braking torques, connect axles 8 and 9 to frame crossmember 17.

Radius means for lateral restraint of tandem axles 8 and 9 in relation to vehicle frame 10, preferably consists of a transverse radius arm 7 connecting transverse beam bracket 19 and vehicle frame bracket 20. Alternately, a transverse radius arm 41 may connect walking beam bracket 40 and vehicle frame bracket 20, illustrated in FIG. 6.

There will be frictional torque on the transverse beam from walking beam movements. Means for preventing rotation of said transverse beam will be required. Said means may be, preferably, a link 6 connecting axle 8 and transverse beam bracket 19.

In FIG. 4, another embodiment of this invention is illustrated wherein the means for lateral restraint of tandem axles 28 and 29 in relation to vehicle frame 30 consists of two transverse radius arms 32 connecting axle brackets 31 and frame brackets 34.

Said vehicle frame 30, including crossmember 35 and spring assembly brackets 33 is typical of a trailer frame which is wider than the typical truck frame 10 shown in FIG. 2.

The arrangement in FIG. 4 refers to tandem trailer axles, but similarly may be used with drive axles illustrated in FIG. 5. Transverse radius arm 42 connects axle banjo bracket 43 and frame bracket 44.

In the preferred embodiment, referring to FIG. 2, the transverse arm connecting transverse beam and vehicle frame is the preferred arrangement for better tire tracking and axle articulation. Angular movements of axles are at the walking beam end connections resulting in less side motion of the tires on ground.

Radius arm, torque arm and walking beam end connections permit tandem axles to move vertically and in articulation while restraining them longitudinally and laterally.

Radius arms and torque arms are provided with means for length adjustment commonly used in vehicle suspension linkage.

The referred-to spring assembly 2 is shown as a rubber spring assembly but may be any other kind that is suitable.

It will be obvious that further modifications of this invention may be possible without departing from the scope defined by the following claims.

I claim:

1. A suspension system for tandem axle vehicles comprising: a spring assembly located on each side of vehicle frame and
   in the "V" space between closely spaced tandem tires, two walking beams located adjacent to tires with opposite
   ends connected to the tandem axles below axle centers, a transverse beam extending through said walking beams, two vertical members, each one located between closely spaced
   tandem tires, with lower ends of said members connected
   to opposite ends of said transverse beam and upper ends
   engaging said spring assemblies, two radius arms in parallel for longitudinal restraint of
   tandem axles in relation to vehicle frame, two torque arms for vehicle braking torques, each
   one connecting an axle to vehicle frame,
   means for lateral restraint of tandem axles in relation to vehicle frame.

2. The suspension system of claim 1 wherein radius means consists of a transverse radius arm connecting transverse beam and vehicle frame.

3. The suspension system of claim 1 wherein radius means consists of a transverse radius arm connecting a walking beam and vehicle frame.

4. The suspension system of claim 1 wherein radius means consists of two transverse radius arms, each one connecting an axle and vehicle frame.

5. The suspension system of claim 1 wherein vertical members are provided with means for compressing spring and means for rebound stop.

6. The suspension system of claim 1 wherein vertical members are provided with means for vehicle height adjustment.

7. The suspension system of claim 1, further comprising: two drive axles.

8. A suspension system for tandem axle vehicles comprising: a spring assembly located on each side of vehicle frame and
   in the space between tandem tires, two walking beams located adjacent to tires with opposite ends pivotally connected to tandem axles, a transverse beam on which said walking beams are pivotal, two vertical members for transmitting ground forces to suspension springs and for suspension rebound stops, each one located in the space between tandem tires, with lower ends of said members connected to opposite extended ends of said transverse beam and upper ends engaging said spring assemblies.

9. The suspension system of claim 8, further comprising: two torque arms for vehicle braking torques, each one
   connecting an axle to vehicle frame.

10. The suspension system of claim 9, further comprising: two radius arms in parallel for longitudinal restraint of
    tandem axles in relation to vehicle frame.

11. The suspension system of claim 9, further comprising: radius means for lateral restraint of tandem axles in
    relation to vehicle frame.

12. The suspension system of claim 11, wherein radius means consists of a transverse radius arm connecting transverse beam and vehicle frame.

13. The suspension system of claim 11, wherein radius means consists of two transverse radius arms, each one connecting an axle to vehicle frame.

* * * * *